(12) United States Patent
Traversat et al.

(10) Patent No.: US 6,233,582 B1
(45) Date of Patent: May 15, 2001

(54) PERSISTENT STORAGE INTERFACE FOR A CONFIGURATION OBJECT-BASED SYSTEM

(75) Inventors: Bernard A. Traversat, San Francisco; Thomas Saulpaugh, San Jose; Jeffrey A. Schmidt, Boulder Creek, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/079,103

(22) Filed: May 14, 1998

(51) Int. Cl.[7] .................................................. G06F 17/30
(52) U.S. Cl. ........................... 707/102; 707/10; 707/103; 709/203; 709/219; 709/250; 709/302
(58) Field of Search ........................... 707/10, 102, 103; 395/200.33, 200.49, 200.5, 200.6; 709/203, 219, 250, 302

(56) References Cited

U.S. PATENT DOCUMENTS

| | | | | |
|---|---|---|---|---|
| 5,771,384 | * | 6/1998 | Remington et al. | 709/303 |
| 5,790,796 | * | 8/1998 | Sadowsky | 709/221 |
| 5,801,701 | * | 9/1998 | Koppolu et al. | 345/352 |
| 5,842,018 | * | 11/1998 | Atkinson et al. | 707/501 |
| 5,857,102 | * | 1/1999 | McChesney et al. | 713/100 |
| 5,877,759 | * | 3/1999 | Bauer | 345/339 |
| 5,884,316 | * | 3/1999 | Bernstein et al. | 707/103 |
| 5,920,725 | * | 7/1999 | Ma et al. | 395/712 |
| 5,936,860 | * | 8/1999 | Arnold et al. | 395/701 |
| 5,951,636 | * | 9/1999 | Zerber | 709/202 |

\* cited by examiner

Primary Examiner—Jean R. Homere
(74) Attorney, Agent, or Firm—Beyer Weaver & Thomas, LLP (57) ABSTRACT

Methods and apparatus for implementing a persistent storage interface that may be used to store entries into a variety of different storage subsystems are disclosed. According to one aspect of the present invention, an object-based system which is arranged to store and to retrieve configuration information includes a server and a client that is in communication with the server. The client communicates with the server using a client/server protocol. The system also includes at least one persistent agent that is arranged to store persistent entries, as well as a persistent storage application programming interface that allows the server to communicate with the at least one persistent agent. The persistent storage application programming interface is arranged to support multiple persistent agents such that different persistent agents may be used with respect to the system. In one embodiment, the object-based system is a Java System Database.

20 Claims, 5 Drawing Sheets

PERSISTENT STORAGE INTERFACE FOR A CONFIGURATION OBJECT-BASED SYSTEM

CROSS-REFERENCE TO RELATED APPLICATIONS

This application is related to U.S. patent application Ser. No. 09/079,042, filed on May 14, 1998, entitled "PERSISTENT STORAGE MANAGERS FOR CONFIGURATION CLIENT/SERVER ENVIRONMENTS;" U.S. patent application Ser. No. 09/079,501, now U.S. Pat. No. 6,161,125, filed on May 14, 1998, entitled "A GENERIC SCHEMA FOR STORING CONFIGURATION INFORMATION ON A CLIENT COMPUTER;" U.S. patent application Ser. No. 09/079,102, filed on May 14, 1998, entitled "METHOD AND APPARATUS FOR A CORE APPLICATION PROGRAMMING INTERFACE;" U.S. patent application Ser. No. 09/079,499, now U.S. Pat. No. 6,119,157, filed on May 14, 1998, entitled "A PROTOCOL FOR EXCHANGING CONFIGURATION DATA IN A COMPUTER NETWORK;" and U.S. patent application Ser. No. 09/079,500, now U.S. Pat. No. 6,052,720 filed on May 14, 1998, entitled "A GENERIC SCHEMA FOR STORING CONFIGURATION INFORMATION ON A SERVER COMPUTER;" and U.S. Provisional Application No. 60/085,425, filed on May 14, 1998, entitled "JAVA SYSTEM DATABASE," which are all incorporated herein by reference.

BACKGROUND OF THE INVENTION

1. Field of Invention

The present invention relates generally to client-server systems. More particularly, the present invention relates to methods and apparatus for enabling a system database server to interact with a persistent subsystem.

2. Description of the Related Art

The use of networked computing systems is increasing as the use of personal computers is becoming more prevalent. By networking, or otherwise linking, computer systems together, resources such as software applications may be shared by multiple users, i.e., computer systems. The sharing of resources over a network generally enables each networked user to more efficiently utilize and allocate resources that are local to the user.

In an effort to consolidate resources in a networked computing system, network computers are being developed. Network computers are generally systems which are arranged to access and operate using mostly remote databases and resources. Typically, a platform such as a network computer does not have local access to a writable storage device, e.g., a disk drive. As such, a user who uses a network computer may access and store information on a system database, e.g., a remote system database, that is shared by any number of users. As a result, it is not necessary for the network computer to, for example, have significant writable local storage capabilities.

In a system of network computers which share a system database, data, or entries, may be stored transiently and persistently. A transient entry is a volatile entry that is lost whenever the system database or a network computer associated with the system database crashes, or is shut down. Transient entries are typically entries that are dynamically reconstructed whenever the associated network computer is restarted. Therefore, transient entries are not permanently stored with respect to the system database. A persistent entry is a non-volatile entry and, hence, must be stored in a persistent storage location. One example of a persistent entry is configuration information, which is often a hierarchical structure of objects. Configuration information is information that is related to user environments, e.g., environments associated with specific network computers. In general, when a user logs on to a network computer, the last saved environment associated with the user must generally be retrieved in order to prevent the user from having to reset the environment. As such, persistently storing information related to the environment allows the information to be retrieved.

Persistent information may be stored on a variety of different persistent agents. As mentioned above, a platform such as a network computer generally will not have access to a local, writable storage device. Therefore, a network computer or, more specifically, a client, must effectively interact with a remote server to implement persistency. The remote server then interacts with a persistent agent, or a persistent storage subsystem, to access and store persistent data. The persistent agents include, but are not limited to, databases, directory services, and file systems.

In order for a server to interact with a persistent agent to retrieve, modify, or store entries on the persistent agent, a mapping mechanism is generally defined to transfer configuration information into a format suitable for storage on the persistent agent. For each persistent agent, a specific mapping mechanism must typically be used to transfer configuration information into a suitable format for the particular persistent agent. As a result, persistent agents are typically not "pluggable," as one persistent agent is not necessarily compatible with another persistent agent. In other words, the mapping mechanism used for one persistent agent may not be used with another persistent agent.

Maintaining different mapping mechanisms, or persistent storage application programming interfaces (APIs), for different persistent agents is often inefficient, as the different mapping mechanisms are not generic. In other words, one mapping mechanism may not be used to support substantially any persistent agent. The inefficiency may further be due, at least partially, to code bloat, since separate mapping mechanisms must generally be separately coded for use with each persistent agent. In addition, the inefficiency may be due to the fact that a server, or a system database, may only support certain persistent agents for which mapping mechanisms are available, i.e., available with respect to the server.

Therefore, what is needed is a generic and efficient persistent storage API. In other words, what is desired is a persistent storage API which defines a mapping that may be used with a variety of different persistent storage agents.

SUMMARY OF THE INVENTION

The present invention relates to a persistent storage interface that may be used to store entries into a variety of different storage subsystems. According to one aspect of the present invention, an object-based system which is arranged to store and to retrieve configuration information includes a server and a client that is in communication with the server. The client communicates with the server using a client/server protocol. The system also includes at least one persistent agent that is arranged to store persistent entries, as well as a persistent storage application programming interface that allows the server to communicate with the at least one persistent agent. The persistent storage application programming interface is arranged to support multiple persistent agents such that different persistent agents may be used with respect to the system.

In one embodiment, the multiple persistent agents include a persistent database and a Java Naming and Directory Interface. In such an embodiment, the multiple persistent agents may further include a lightweight directory access protocol. In another embodiment, the persistent storage application programming interface further includes a mechanism arranged to store mapping information associated with a persistent entry. The mapping information is arranged to enable the persistent entry to be transferred from the server to the persistent agent.

According to another aspect of the present invention, a persistent storage application programming interface for a configuration object-based system is arranged to allow persistent information to be transferred between a server of the object-based system and a first persistent agent. The persistent storage application programming interface is further arranged to generate a representation of the persistent information that is suitable for use with respect to the first persistent agent. Such a persistent storage application programming interface includes methods that allow the server to access the first persistent agent as well as additional persistent agents which may be different from the first persistent agent. The methods include methods that define a transaction interface, a method that allows information to be stored on the first persistent agent, and a method that allows information to be obtained from the first persistent agent by the server. In one embodiment, the methods arranged to allow the server to access the first persistent agent further include a method that allows the server to register with the first persistent agent such that the first persistent agent is arranged to notify the server of a change made to information stored on the first persistent agent.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which.

DETAILED DESCRIPTION OF THE EMBODIMENTS

When a client such as a network computer attempts to store a persistent entry, the client generally interacts with a remote server which is in communication with a persistent agent. The remote server typically uses a mapping mechanism to place the persistent entry in a proper format to be stored on the persistent agent. As will be appreciated by those skilled in the art, the persistent agent may be one of a variety of different subsystems. Typically, for each persistent agent, a specific mapping mechanism is used to transfer configuration information into a format that is associated with the particular persistent agent. As a result, a mapping mechanism is not necessarily compatible with more than a particular persistent agent.

When a mapping mechanism may only be associated with one persistent agent, the server which uses the mapping mechanism may be limited to interfacing with only that persistent agent. Alternatively, maintaining different mapping mechanisms for different persistent agents is often inefficient due, for example, to the proliferation of computer code and, hence, the consumption of significant resources.

A mapping mechanism that may be used with a variety of different persistent storage agents allows a server associated with a system database to support the different persistent agents essentially without the proliferation of computer code. Such a mapping mechanism may be used to convert entries, as for example those originating from a client that is a network computer, into a persistent format that may be stored by a server onto substantially any suitable persistent agent, or subsystem.

Computing networks which are arranged to support network computers generally use a system database as a central configuration component. In one embodiment, the system database, or configuration database, may be a Java™ system database (JSD), although it should be appreciated that the system database may be substantially any suitable database. The JSD generally allows an operating system, system services, applications, and tools to store and retrieve configuration information on a Java™-based platform. Configuration information is arranged to describe, for example, the physical devices that are present on the machine, the system software services that are installed, and the specific user and group application profiles. The JSD effectively serves as a central repository to store, as well as access, substantially any information which is used for configuration purposes. Hence, using the JSD, applications and services may access varied configuration setups.

Figure 1:
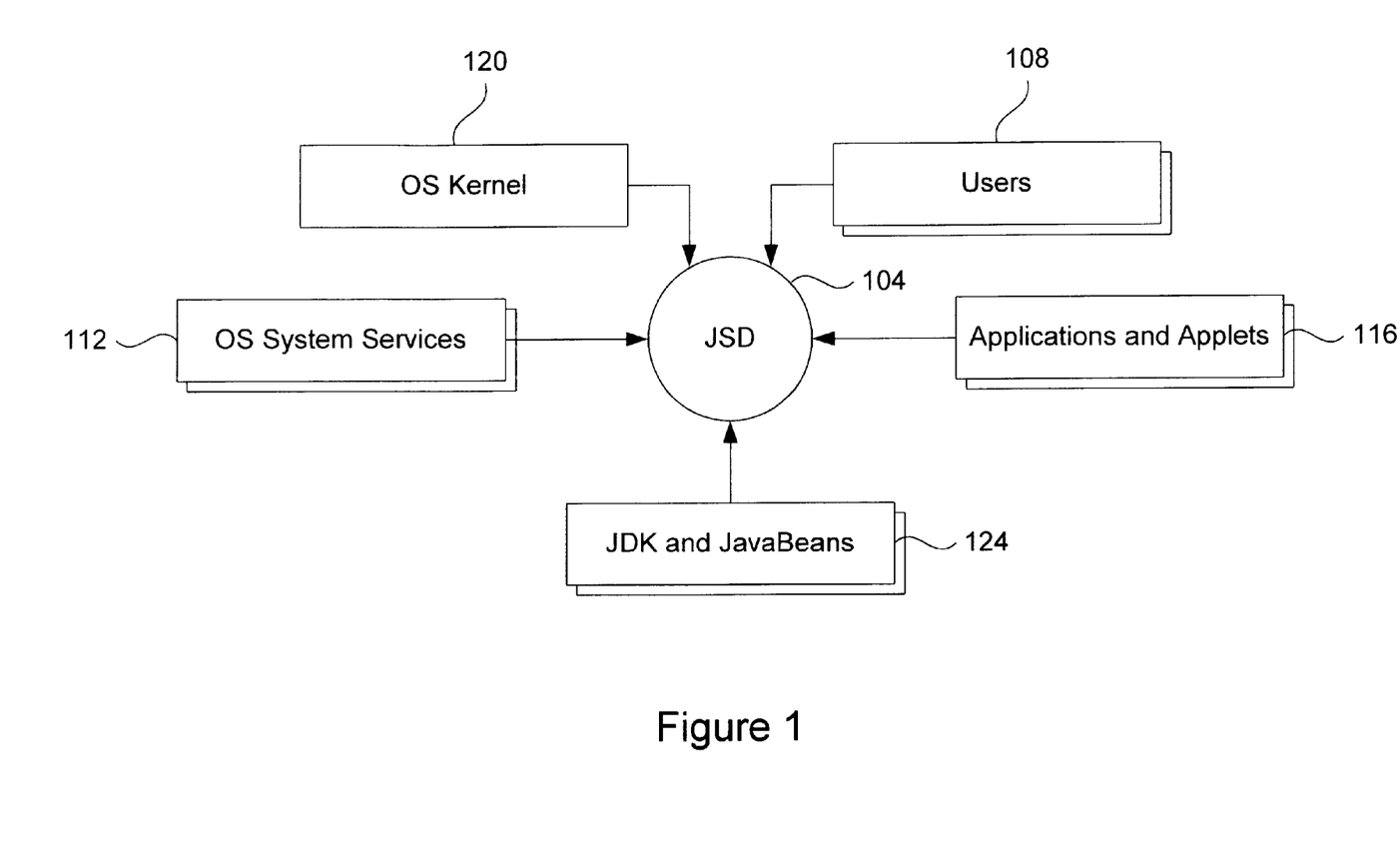
FIG. 1 is a diagrammatic representation of relationships associated with a system database in accordance with an embodiment of the present invention.

Referring initially to FIG. 1, the general relationships associated with a system database will be described in accordance with an embodiment of the present invention. A system database 104, e.g., a JSD, generally provides services to clients or, more specifically, users 108. In other words, within a client-server environment, system database 104 effectively serves as a client-side configuration and communications hub. System database 104 serves as a central database in a network of computing systems with an associated API typically includes a hierarchy of entries, each of which is effectively an atomic unit of information that is identified by a path name, i.e., a unique path name. An API is a specification of how a programmer, or a software developer, accesses the behavior and state of classes and objects. An entry in system database 104 often contains one or more associated properties, which are arranged to provide descriptions of the entries. Entries on system database 104 may be store in a tree hierarchy.

System database 104 provides users 108 with services which may include, but are not limited to, information storage, information retrieval, and information publishing. Specifically, system database 104 typically allows users 108 to store, retrieve, and publish information relating to the configurations associated with users 108.

Configurations, or configuration information, often includes information that describes devices which are associated with system database 104. Such devices are generally associated with users 108. Configuration information may also include configuration descriptions of system services, e.g., operating system (OS) system services 112. In some embodiments, configuration information further describes selected group and user attributes, as well as substantially any necessary application-specific information that is associated with software applications 116 which are available to users 108 through system database 104. It should be appreciated that applications 116 may include applets, such as those written in the Java™ programming language developed by Sun Microsystems, Inc., of Palo Alto, California.

In addition to being in communication with users 108, system services 112, and applications 116, system database 104 is also generally associated with an OS kernel 120. In the embodiment as shown, since system database 104 is a JSD, system database 104 is also associated with Java specific software including, for example, a Java Development Kit (JDK) and JavaBeans™. A JDK is a software development environment, available commercially from Sun Microsystems, Inc., that may be used to write applications and applets in the Java programming language. JavaBeans™ are a portable, platform-independent reusable component model created for the Java programming language.

Figure 2:
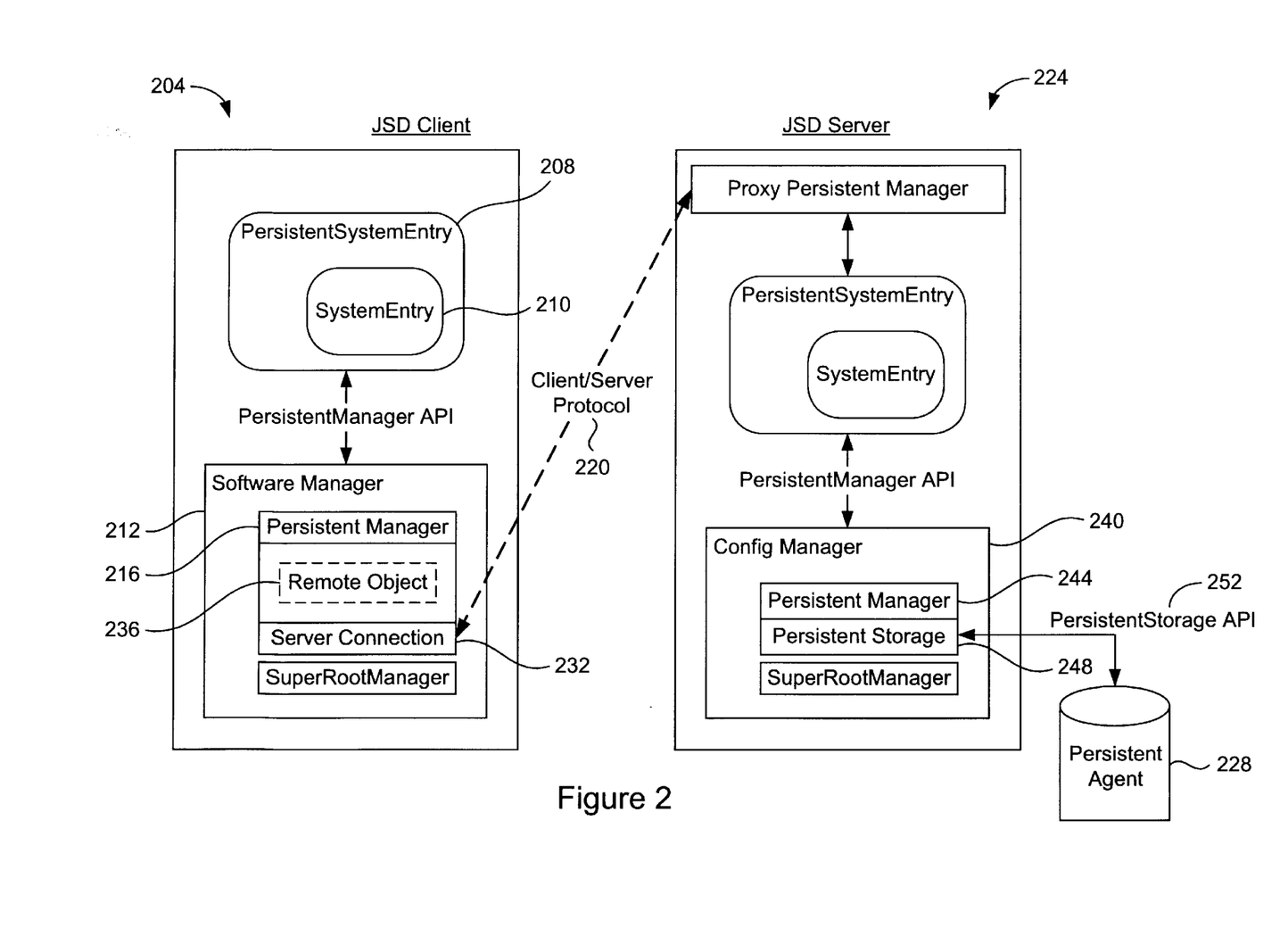
FIG. 2 is a diagrammatic representation of an overall client/server architecture in accordance with the present invention.

With reference to FIG. 2, an overall client/server architecture will be described in accordance with the present invention. In particular, the overall client/server architecture of a system with a JSD client and a JSD server will be described, although it should be appreciated that the architecture may be the architecture of substantially any suitable client/server system. A client 204 includes a persistent system entry class 208 which is managed by a software manager 212. Persistent system entry class 208 is generally defined as a subclass of a system entry class 210, and implements substantially all interfaces defined by the entry interface associated with system entry class 210.

Software manager 212 is associated with a persistent manager 216. More specifically, software manager 212 is an instance of a PersistentManager class and is arranged to essentially provide backing storage for entries within its namespace. Additionally, software manager 212 uses a client/server protocol 220 to communicate with a server 224, as well as to store and to retrieve entries from permanent storage such as a persistent agent 228. Persistent agent 228 generally includes disk storage mediums, databases, and external directory services.

Included in software manager 212 is an instance of a server connection object 232 that is arranged to activate and to manage a connection between client 204 and server 224. In one embodiment, server connection object 232 uses a remote object reference 236 to communicate with server 224 using an internet inter-ORB protocol (IIOP). Remote object reference 236 may be a uniform resource locator (URL) to an object. Generally, remote object reference 236 may implement a lower level portion of client/server protocol 220, while server connection object 232 may implement an upper level portion of client/server protocol 220.

When client 204 changes an entry, e.g., a persistent entry, in the software namespace, the changes are generally propagated to a user-specific area on server 224. On server 224, persistent system entries are typically managed by a config manager 240, which is an instance of a persistent manager 244. Config manager 340 provides backing storage for entries within its namespace, and interacts with persistent agent 228 through a persistent storage object 248. Persistent storage object 248 forwards entry changes to persistent agent 228 which, in the described embodiment, is permanent storage. In general, persistent storage object 248 communicates with persistent agent 228 through a persistent storage interface 252, or a persistent storage application programming interface (API), as will be discussed below with reference to FIG. 3a.

In the described embodiment, as client 204 is a network computer, client 204 and server 224 are typically located on separate machines. However, in some embodiments, client 204 and server 224 may be located on the same machine. By way of example, for a mobile network computing device, client 204 and server 224 may both be located on the mobile network computing device.

Figure 3A:
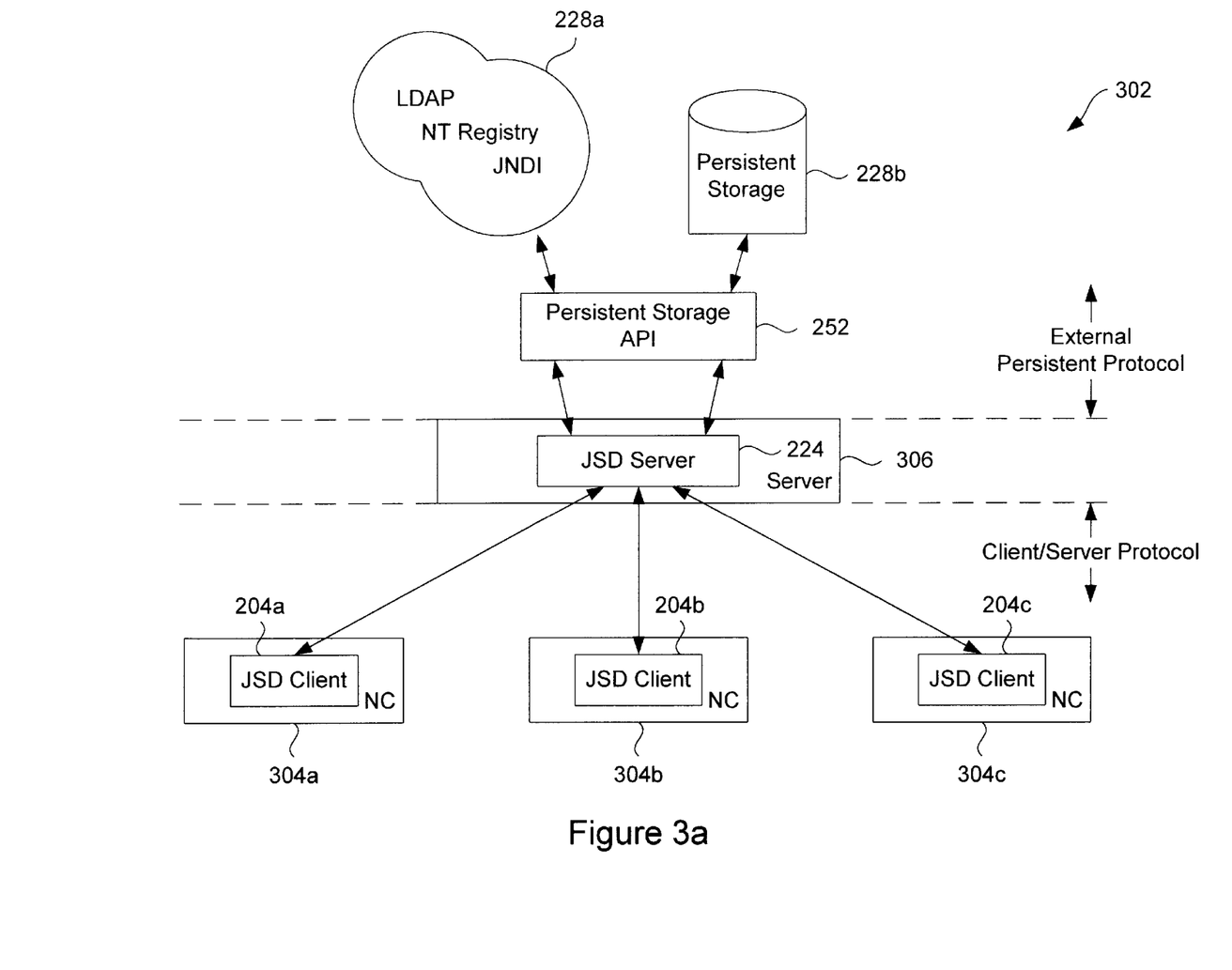
FIG. 3a is a diagrammatic representation of a two-tier model of a system database client/server in accordance with an embodiment of the present invention.
Figure 3B:
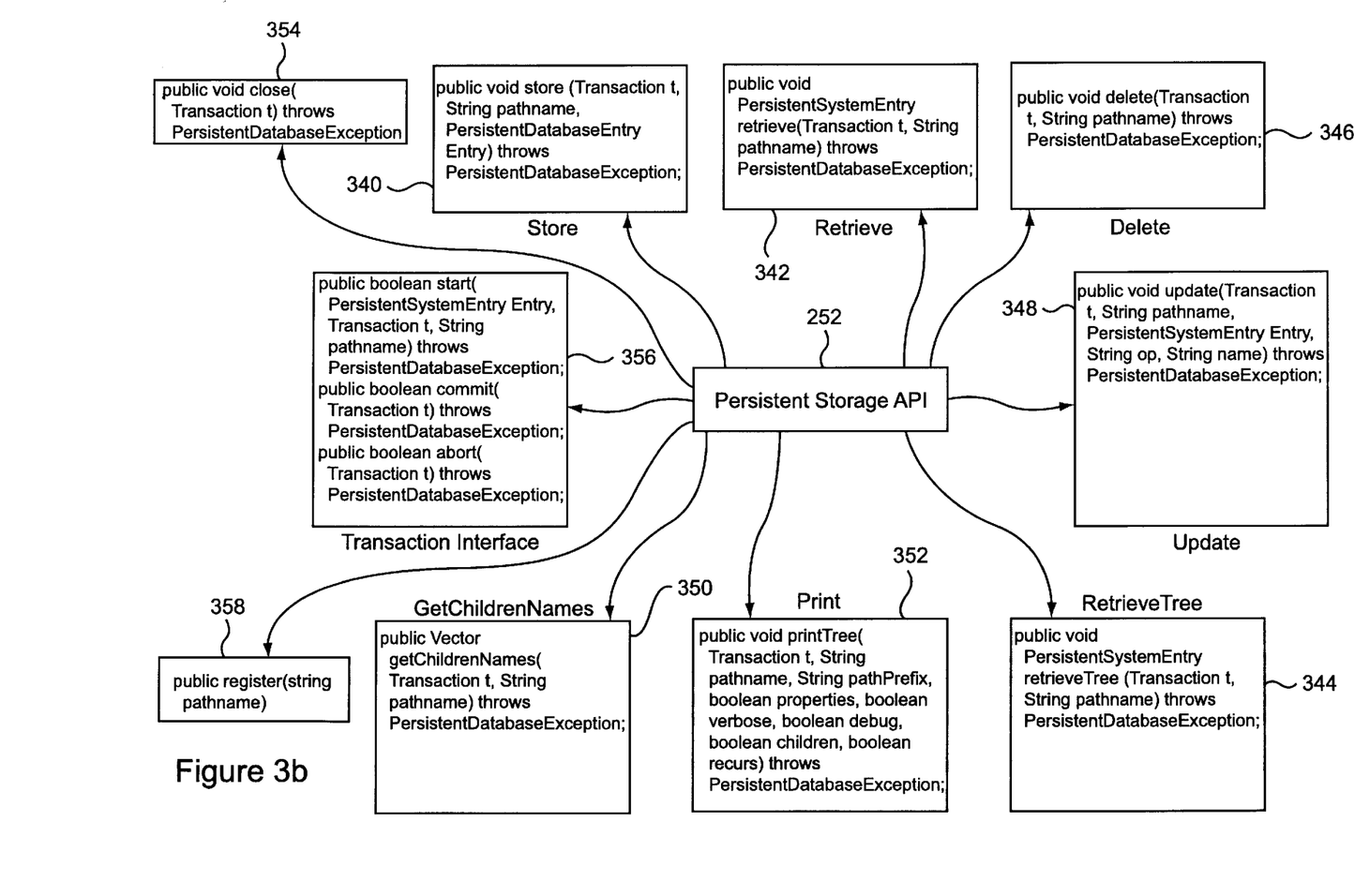
FIG. 3b is a diagrammatic representation of the methods associated with a persistent storage application programming interface in accordance with an embodiment of the present invention.

Referring next to FIGS. 3a and 3b, a persistent storage API, e.g., persistent storage API 252 of FIG. 2, will be described. FIG. 3a is a diagrammatic representation of a two-tier model of a system database client/server in accordance with an embodiment of the present invention, and FIG. 3b is a diagrammatic representation of the methods associated with persistent storage API 252 in accordance to an embodiment of the present invention. Referring initially to FIG. 3a, in one embodiment, two-tier model 302 is a two-tier model of a JSD client/server. Generally, two-tier model 302 allows a server 306 to provide a distributed point of control to manage client configuration databases. System database administration tools running on server 306 may perform client configuration operations without logging onto a client, e.g., one of clients 304a, 304b, and 304c. Two-tier model 302 also allows for clients 304 to essentially use a single protocol to communicate with server 306.

Clients 304 are, in the described embodiment, network computers with which system database clients 204 are associated. Clients 304 communicate with server 306 or, more particularly, system database server 224 which is associated with server 306 using substantially any suitable client/server protocol. As such, when a client, e.g., client 304a, wishes to access a persistent agent 228 such as a persistent storage database 228b, client 304a communicates with server 306, which then accesses persistent storage database 228b using persistent storage API 252.

Clients 304 typically transfer entries to server 306, which then process the entries using persistent storage API 252. In one embodiment, persistent storage API 252 uses a specialized representation of an entry. Persistent storage API 252 represents an entry as a tuple composed of an index and a record. The index may be a path name associated with the entry in the overall system database hierarchy, while the record may be a serialized value of an object, e.g., a Java object, that represents the entry. Such an object may be a persistent system entry object. As will be appreciated by those skilled in the art, the serialized value of an object may be a binary representation of the object.

In general, the index provides a unique way to identify substantially every entry in the overall system database hierarchy, e.g., in the JSD hierarchy, since two entries in such a hierarchy may not have the same path name.

It should be appreciated that persistent agents 228 may, in addition to including persistent storage database 228b, include, but are not limited to, various directory services such as a Lightweight Directory Access Protocol (LDAP), an NT Registry, or a Java Naming and Directory Interface (JNDI), which is a set of APIs that assist with the interface to multiple naming and directory services. The NT Registry is available commercially from Microsoft, Inc. of Redmond, Washington, while the JNDI is available commercially from Sun Microsystems, Inc. of Palo Alto, Calif.

The JNDI includes a Java based API that effectively provides a generic interface to multiple naming and directory services in an enterprise, e.g., an enterprise-wide directory service. In general, the JNDI enables an essentially seamless connectivity to heterogenous enterprise naming and directory services such as, but not limited, to a LDAP or a directory naming service (DNS). Using the JNDI, applications programmers may access configuration and directory information which is used to write applications that run on a variety of different platforms.

Persistent storage API 252 effectively serves as a "bridge" from a system database, e.g., a JSD, to persistent agents 228, or enterprise databases, from which legacy data may be obtained. Such persistent agents 228 often contain information such as configuration information which a system database may obtain and store temporarily. In the described embodiment, persistent storage API 252 is arranged to allow server 306 or, more specifically, a back end of server 306 to communicate with substantially any persistent agent 228 to retrieve and store information. In general, persistent storage API 252 provides a generic API, i.e., persistent storage API 252 may be used by server 306 to communicate with substantially any persistent agent 228. Hence, persistent storage API 252 is arranged to allow the "plugging in" of different types of persistent implementations with server 306.

Persistent storage API 252 defines a "meta-property" for each property associated with an entry. In general, the properties associated with an entry may vary widely. However, the properties, or attributes, generally relate to the entry itself. By way of example, a property may be the name of an entry. In the described embodiment, the name of an entry is substantially a unique name, i.e., the name is unique among all siblings of the parent under which the entry resides.

A meta-property may generally take any suitable format. In a Java environment, the meta-property may take the form of a ".PERSISTENT.propname." That is, the meta-property may be an extension on the path associated with a particular property. Such a meta-property is arranged to store persistency-dependent information. By way of example, for a persistent agent 228 that is an LDAP, the meta-property may include information that is used to maintain the mapping context from which the property is stored or retrieved within the LDAP directory service. As the system database and the LDAP have different schema, the meta-property is essentially used to maintain the mapping information between the different schema.

Persistent storage API 252 generally provides a variety of methods, as will be discussed with reference to FIG. 3b. Typically, however, persistent storage API 252 provides methods which are arranged to store an individual entry 340, methods which are arranged to retrieve an entire branch from an associated tree 344, methods which are arranged to retrieve an individual entry 342, methods arranged to delete an entry 346, and methods arranged to update an entry 348. Additional methods include, but are not limited to, methods arranged to get the names of children of an entry 350, methods arranged to display an entire branch of a specified tree 352, methods that "close" persistent storage 354, and methods that register a server with persistent storage 358.

Methods associated with persistent storage API 252 that are arranged to store an individual entry 340 include a store ( ) method that stores a specified persistent system entry that is associated with a given entry path. A retrieve( ) method 342 retrieves the entry that corresponds to a specified path name, while a retrieveTree( ) method 344 retrieves the branch with the root entry that is associated with a specified path name. The retrieveTree( ) method 344 may be used as part of an interface, e.g., a retrieveTree API, that enables persistent manager developers to speed up the booting of clients 304. In other words, the retrieveTree( ) method 344 or operation may be involved in the booting process of clients 304. Specifically, a retrieveTree( ) method 344 may efficiently retrieve an entire hierarchy associated with either a tree or a branch of a tree such that the booting of clients 304 may occur more quickly. Methods which delete entries 346 include a delete( ) method which deletes the entry that corresponds to a specified path name. Methods which update an entry 348 include an update( ) method that updates a specified property of an entry associated with a given path name.

In general, the additional methods associated with persistent storage API 252, as mentioned above, may include methods which are arranged to obtain names of children associated with an entry, as well as methods which are arranged to display an entire branch of a specified tree. One method which is arranged to obtain the names of children 350 may be a getChildrenNames( ) method that returns a vector of the names of the children of the entry associated with a specified path name, while a method which is arranged to display a branch 352 may be a printTree( ) method that prints a description of the branch which originates at the root entry corresponding to a specified path name.

Methods associated with persistent storage API 252 may also include a close( ) method 354 that is used to close the persistent storage. That is, close( ) method 354 is used to ensure that all data, e.g., entries, have been safely written or returned to the persistent storage. Another method that may be included with respect to persistent storage API 252 is register( ) method 358. Registero method 358 allows a server to register itself with persistent storage such that the server may be notified in the event that the persistent storage is accessed by another entity, e.g., another server, while the server is effectively in the process of interfacing with the persistent storage. In other words, register( ) method 358 enables a server to be registered with respect to persistent storage, and further enables the persistent storage to send a notification to the server when an entry stored on the persistent storage has been accessed or changed.

In the described embodiment, persistent storage API 252 also provides transactional interfaces 356 which are arranged to implement transactional support on persistent agents 228 as shown in FIG. 3a. Transactional interfaces 356 may define an atomic transaction model that allows a transaction to be completed before allowing another transaction to begin with respect to persistent agents 228. In other words, one operation may effectively be "guaranteed" of completion prior to allowing another operation to commence. As some persistent agents 228, e.g., and LDAP, may not provide transactional support, the methods or operations associated with transactional interfaces may be null operations. While such methods may vary widely, such methods typically include a start( ) methods, commit( ) methods, and abort( ) methods. A start( ) method may be arranged to begin a specified transaction on the subtree which has the root specified by a given path name, in addition to locking subtree entries. A commit( ) method may be arranged to commit a specified, e.g., current, transaction, and an abort ( ) method may be arranged to abort a specified transaction.

Figure 4:
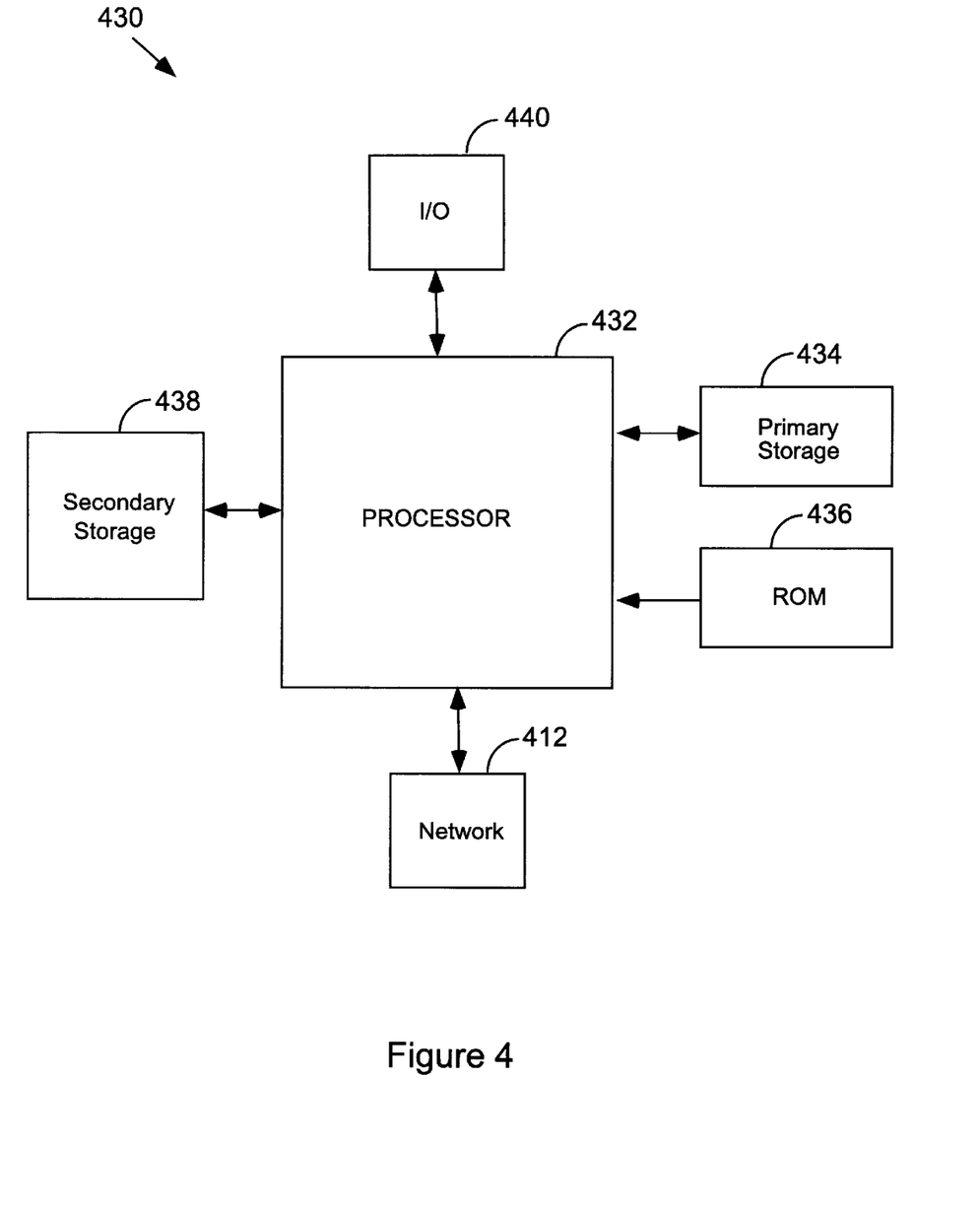
FIG. 4 is a diagrammatic representation of a computer system suitable for implementing the present invention.

FIG. 4 illustrates a typical, general-purpose computer system suitable for implementing the present invention. A computer system 430 includes at least one processor 432, also referred to as a central processing unit (CPU), that is coupled to memory devices. Processor 432 may be part of a network computer, e.g., processor 432 may be in communication with a network computer. The memory devices may generally include primary storage devices 434, such as a read only memory (ROM), and primary storage devices 436, such as a random access memory (RAM).

As is well known in the art, ROM 434 acts to transfer data and instructions uni-directionally to CPU 432, while RAM 436 is used typically to transfer data and instructions to and from CPU 432 in a bidirectional manner. Both primary storage devices 434, 436 may include substantially any suitable computer-readable media. A secondary storage medium 438, which is typically a mass memory device, may also be coupled bi-directionally to CPU 432. In general, secondary storage medium 438 is arranged to provide additional data storage capacity, and may be a computer-readable medium that is used to store programs including computer code, computer program code devices, data, and the like. In one embodiment, secondary storage medium 438 may be a system database which is shared by multiple computer systems. Typically, secondary storage medium 438 is a storage medium such as a hard disk or a tape which may be slower than primary storage devices 434, 436. Secondary storage medium 438 may take the form of a well-know device including, but not limited to, magnetic and paper tape readers. As will be appreciated by those skilled in the art, the information retained within secondary storage medium 438, may, in appropriate cases, be incorporated in a standard fashion as part of RAM 436, e.g., as virtual memory. A specific primary storage device 434 such as a CD-ROM may also pass data uni-directionally to CPU 432.

CPU 432 is also coupled to one or more input/output devices 440 that may include, but are not limited to, video monitors, track balls, mice, keyboards, microphones, touch-sensitive displays, transducer card readers, magnetic or paper tape readers, tablets, styluses, voice or handwriting recognizers, as well as other well-known input devices, such as other computers. Finally, CPU 432 may be coupled to a computer or a telecommunications network, e.g., an internet network or an intranet network, using a network connection as shown generally at 412. With such a network connection 412, it is contemplated that the CPU 432 may receive information from a network. CPU 432 may also output information to the network. Such information, which is often represented as a sequence of instructions to be executed using CPU 432, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, while the system database of the present invention has been described as being a JSD, it should be appreciated that the system database may be any suitable configuration database. In other words, the use of a "generic" persistent storage API may be applied to substantially any suitable system database.

While one embodiment of a persistent storage API has been described, it should be appreciated that the persistent storage API may vary without departing from the spirit or the scope of the present invention. For example, the methods associated with the persistent storage API may be widely varied. In general, methods may be added, modified, and removed.

Further, while a persistent agent has effectively been described as being either a persistent database, an LDAP, a NT Registry, or a JNDI, the persistent agent may generally be any suitable persistent agent. Therefore, the present examples are to be considered as illustrative and not restrictive, and the invention is not to be limited to the details given herein, but may be modified within the scope of the appended claims.

What is claimed is:

1. An object-based system arranged to store and to retrieve configuration information, the object-based system comprising:
   a server;
   a client in communication with the server, wherein the client is in communication with the server using a client/server protocol;
   a plurality of persistent agent including a persistent database and a directory service, the persistent agents being arranged to store persistent entries; and
   a persistent storage application programming interface, the persistent storage application programming interface being defined between the server and the one persistent agents and arranged to allow the server to communicate with the persistent agents, wherein the persistent storage application programming interface is arranged to support multiple persistent agents.

2. An object-based system as recited in claim 1 wherein the directory service is a Java Naming and Directory Interface compatible director service.

3. An object-based system as recited in claim 2 wherein the multiple persistent agents further include a lightweight directory access protocol compatible directory service.

4. An object-based system as recited in claim 1 wherein the directory service is a lightweight directory access protocol compatible directory service.

5. An object-based system as recited in claim 1 wherein the object-based system is a Java System Database.

6. An object-based system as recited in claim 1 wherein the persistent storage application programming interface is further arranged to create a generic representation of a persistent entry that may be mapped into a selected one of the agents.

7. An object-based system as recited in claim 6 wherein the generic representation of the persistent entry may be mapped into each of the supported multiple persistent agents.

8. An object-based system as recited in claim 1 wherein the persistent storage application programming interface further includes a mechanism arranged to store mapping information associated with a persistent entry, the mapping information being arranged to enable the persistent entry to be transferred from the server to an associated persistent agent.

9. An object-based system as recited in claim 1 wherein the multiple persistent agents supported by the persistent storage application programming interface include a first persistent agent and a second persistent agent, the first persistent agent being of a different configuration than the second persistent agent.

10. An object-based system as recited in claim 1 wherein the client is arranged to pass information to the server, and the server is arranged to pass the information through the persistent storage application programming interface to the persistent agents for storage.

11. An object-based system as recited in claim 1 wherein the server further includes a persistent storage object, the persistent storage object being arranged to communicate with the persistent storage agents through the persistent storage application programming interface.

12. A persistent storage application programming interface for use in a configuration object-based system that includes a server and a plurality of persistent agent including a persistent database and a directory service, the persistent storage application programming interface being defined between the server and the persistent agent and being arranged to allow persistent information to be transferred between the server of the object-based system and the persistent agents, the persistent storage application programming interface further being arranged to generate a representation of the persistent information suitable for use with respect to a first one of the persistent agents the persistent storage application programming interface comprising:

methods arranged to allow the server to access the first persistent agent, the methods further being arranged to allow the server to access additional persistent agents, wherein the methods include methods that define a transaction interface, a method that allows information to be stored on the first persistent agent, and a method that allows information to be obtained from the first persistent agent by the server.

13. A persistent storage application programming interface as recited in claim 12 wherein the methods arranged to allow the server to access the first persistent agent further include a method that allows the server to register with the first persistent agent such that the first persistent agent is arranged to notify the server of a change made to information stored on the first persistent agent.

14. A persistent storage application programming interface as recited in claim 12 wherein the methods arranged to allow the server to access the first persistent agent further include a method that allows information stored on the first persistent agent to be updated.

15. A persistent storage application programming interface as recited in claim 12 wherein the methods arranged to allow the server to access the first persistent agent further include a method that allows a hierarchy associated with a tree stored on the first persistent agent to be obtained by the server.

16. A persistent storage application programming interface as recited in claim 15 wherein the method that allows the hierarchy associated with a tree stored on the first persistent agent to be obtained by the server is arranged to allow a client associated with the configuration object-based system to be efficiently booted up.

17. A persistent storage application programming interface as recited in claim 12 wherein the representation of the persistent information that is suitable for use with respect to the first persistent agent is further suitable for use with the additional persistent agents.

18. A persistent storage application programming interface as recited in claim 12 wherein the methods that define a transaction interface include methods that define an atomic transaction model.

19. A computer program product for storing and retrieving configuration information in a computing system, the computing system including a client and a server, the computer program product comprising:

computer code for allowing the client to communicate with the server, computer code for storing persistent entries using persistent agents the persistent agents including a persistent database a directory service;

computer code for enabling a persistent storage application programming interface to allow the server to communicate directly with the persistent agents and to support multiple persistent agents; and a computer readable medium that stores the computer codes.

20. A computer program product according to claim 19 wherein the computer code for enabling the persistent storage application programming interface to allow the server to communicate with the persistent agents and to support multiple persistent agents further includes computer code for creating a generic representation of a persistent entry that may be mapped into the persistent agents.

* * * * *